(12) United States Patent
Groepl et al.

(10) Patent No.: US 8,525,435 B2
(45) Date of Patent: Sep. 3, 2013

(54) CIRCUIT ARRANGEMENT AND METHOD FOR CONTROLLING LIGHT EMITTING COMPONENTS

(75) Inventors: Martin Groepl, Sonthofen/Oberallgaeu (DE); Holger Hoeltke, München (DE)

(73) Assignee: Silicon Line GmbH, Munich (DE)

( * ) Notice: Subject to any disclaimer, the term of this patent is extended or adjusted under 35 U.S.C. 154(b) by 74 days.

(21) Appl. No.: 12/950,766

(22) Filed: Nov. 19, 2010

(65) Prior Publication Data

US 2011/0121742 A1    May 26, 2011

Related U.S. Application Data

(63) Continuation of application No. PCT/EP2009/056284, filed on May 25, 2009.

(30) Foreign Application Priority Data

May 21, 2008   (DE) .......................... 10 2008 001 940

(51) Int. Cl.
*H05B 37/02* (2006.01)

(52) U.S. Cl.
USPC ............................ 315/291; 315/300; 315/307

(58) Field of Classification Search
USPC ... 315/291–307, 209 R, 210, 194, 185 R–185 S, 312, 315
See application file for complete search history.

(56) References Cited

U.S. PATENT DOCUMENTS

| | | | |
|---|---|---|---|
| 5,012,384 A | 4/1991 | Chew | |
| 5,019,769 A | 5/1991 | Levinson | |
| 5,672,994 A | 9/1997 | Au et al. | |
| 5,834,813 A | 11/1998 | Ma et al. | |
| 5,949,253 A | 9/1999 | Bridgewater, Jr. | |
| 6,031,855 A | 2/2000 | Watanabe | |

(Continued)

FOREIGN PATENT DOCUMENTS

| DE | 10 2004 032456 B3 | 4/2006 |
|---|---|---|
| EP | 0 798 828 A | 10/1997 |

(Continued)

OTHER PUBLICATIONS

U.S. Appl. No. 12/654,515, filed Dec. 2009, Groepl et al.

(Continued)

*Primary Examiner* — Jimmy Vu
*Assistant Examiner* — Henry Luong
(74) *Attorney, Agent, or Firm* — Shlesinger, Arkwright & Garvey LLP.

(57) ABSTRACT

In order to further develop a circuit arrangement and a method for controlling at least one light emitting component, to which a threshold current is applied, with the circuit arrangement being supplied with voltage by means of at least one supply element, and with the light emitting component being controlled by means of at least one switching element arranged between at least one current limiting element and the light emitting component using at least one switching controller, in such a way that the power efficiency is significantly increased in comparison to prior art, it is proposed that a maximum value of the current is provided by means of the current limiting element, and that the logical "1" of the data to be transmitted by means of the light emitting component is represented by periodic switching between the zero value of the current and the maximum value of the current supplied to the light emitting component.

15 Claims, 3 Drawing Sheets

(56) References Cited

U.S. PATENT DOCUMENTS

| | | | |
|---|---|---|---|
| 6,392,358 B1 * | 5/2002 | Runau et al. | 315/185 R |
| 6,650,143 B1 | 11/2003 | Peng | |
| 6,667,661 B1 | 12/2003 | Liu et al. | |
| 6,812,733 B1 | 11/2004 | Plasterer et al. | |
| 6,965,722 B1 | 11/2005 | Nguyen | |
| 6,975,135 B1 | 12/2005 | Bui | |
| 7,133,429 B2 | 11/2006 | Moran | |
| 7,154,923 B2 | 12/2006 | Kucharski | |
| 7,173,851 B1 | 2/2007 | Callahan et al. | |
| 7,272,067 B1 | 9/2007 | Huang et al. | |
| 7,280,425 B2 | 10/2007 | Keshavarzi et al. | |
| 7,595,661 B2 | 9/2009 | Kim | |
| 8,194,431 B2 | 6/2012 | Groepl et al. | |
| 8,258,813 B2 | 9/2012 | Groepl et al. | |
| 2001/0043093 A1 * | 11/2001 | Sakura et al. | 327/108 |
| 2002/0117724 A1 | 8/2002 | Ariyoshi et al. | |
| 2003/0058725 A1 | 3/2003 | Bell | |
| 2003/0094977 A1 | 5/2003 | Li et al. | |
| 2004/0160996 A1 | 8/2004 | Giorgi et al. | |
| 2004/0195978 A1 | 10/2004 | Horiuchi et al. | |
| 2004/0208011 A1 | 10/2004 | Horiuchi et al. | |
| 2005/0185428 A1 | 8/2005 | Crawford et al. | |
| 2006/0133435 A1 * | 6/2006 | Ikeda | 372/38.02 |
| 2007/0159434 A1 * | 7/2007 | Yen et al. | 345/92 |
| 2007/0291807 A1 | 12/2007 | Uesaka | |
| 2008/0007985 A1 | 1/2008 | Wilcox | |
| 2008/0012507 A1 | 1/2008 | Nalbant | |
| 2008/0154103 A1 * | 6/2008 | LeMay | 600/323 |
| 2008/0304527 A1 | 12/2008 | Gao et al. | |

FOREIGN PATENT DOCUMENTS

| | | |
|---|---|---|
| EP | 1 777 708 A1 | 4/2007 |
| EP | 1 816 723 A2 | 8/2007 |
| FR | 2 889 643 A | 2/2007 |
| GB | 2 365 788 A | 2/2002 |
| WO | WO2007/069104 A | 6/2007 |
| WO | WO2008/050779 A | 5/2008 |

OTHER PUBLICATIONS

U.S. Appl. No. 12/654,951, filed Jan. 2010, Groepl et al.
U.S. Appl. No. 12/654,514, filed Dec. 2009, Groepl et al.
U.S. Appl. No. 12/901,515, filed Oct. 2010, Groepl et al.
U.S. Appl. No. 13/083,282, filed Apr. 2011, Groepl et al.
PCT International Preliminary Report on Patentability, and Written Opinion in application No. PCT/EP2009/056284, dated Dec. 6, 2010 (7 pages).

* cited by examiner

CIRCUIT ARRANGEMENT AND METHOD FOR CONTROLLING LIGHT EMITTING COMPONENTS

CROSS-REFERENCE TO RELATED APPLICATIONS

This application is a continuation of application no. PCT/EP2009/056284, filed 25 May 2009, which claims the priority of German application no. 10 2008 001 940.2, filed 21 May 2008, and each of which is incorporated herein by reference.

TECHNICAL FIELD

The present invention basically relates to the technical field of optical data transmission from at least one light emitting component to at least one light-receiving component.

The present invention in particular relates to a circuit arrangement, in particular to a driver circuit, for controlling at least one light emitting component, to which a threshold current is applied, and to a method for controlling at least one light emitting component, to which a threshold current is applied.

Within the scope of the present invention, the term light or light emitting is understood not only as the range of electromagnetic radiation visible to the eye, extending in a wavelength range from about 380 nanometers to about 780 nanometers (which corresponds to a frequency of about 789 terahertz down to about 385 terahertz).

Rather, the term light or light emitting is understood as the entire electromagnetic wavelength or frequency spectrum, including the spectrum not visible to the eye, in particular the I[nfra]R[ed] range (wavelength range up to about 2,000 nanometers or frequency range down to about 150 terahertz), for example a wavelength of about 850 nanometers or a frequency of about 350 terahertz.

PRIOR ART

A typical modulation method in optical communication engineering is the NRZ modulation method (NRZ=Non Return to Zero) illustrated by reference to FIG. 1. In compliance with their state (level 0 corresponding logical "0" or level 1 corresponding logical "1"), the bits to be transmitted are directly supplied to a light emitting component LE (cf. FIG. 2) as current variation (or voltage variation).

The circuit arrangement, embodied as driver circuit and illustrated by reference to FIG. 2, is provided for controlling the light emitting component LE and comprises a supply element VE in form of a voltage source for supplying the circuit arrangement with voltage.

Between the supply element VE and the light emitting component LE, a current limiting element SB is arranged by means of which a current value $I_1$ is provided.

Between the current limiting element SB and the light emitting component LE, a switching element SW is arranged for controlling the light emitting component LE by means of a switching controller US. The output signal A of said switching controller US controls the switching element SW.

As illustrated by reference to FIG. 3, the average electrical power $P_{el}$ at the NRZ modulated light emitting component LE is given by the product of the flux voltage $U_L$ across the light emitting component LE and of the average current $I_{av}$ flowing through the light emitting component LE.

The average optical output power $P_{opt\_av}$ from the light emitting component LE is given by the product of the conversion efficiency factor $\eta$ of said light emitting component LE and of the provided average electrical current $I_{av}$, i.e. $P_{opt\_av} = \eta * I_{av}$.

At light emitting components LE', in particular at semiconductor lasers, featuring a certain threshold current $I_{th}$ before reaching the nominal conversion efficiency factor $\eta$ (cf. FIG. 4), the threshold current $I_{th}$ always accrues as constant loss; in this respect, the threshold current $I_{th}$ is to be always provided, for example by means of a separate current limiting element SB' (cf. FIG. 6; for the rest, as to FIG. 6 reference is made to FIG. 2, wherein the reference numeral SW' denotes a switching element or a switch).

Because of said necessity of providing the threshold current $I_{th}$ the average electrical power $P_{el}$ at the NRZ modulated light emitting component LE' rises in disadvantageous way, as illustrated by reference to FIG. 5.

Against this background, it appears desirable to drop the necessity of providing the threshold current.

DISCLOSURE OF THE PRESENT INVENTION

Object, Solution, Advantages

Starting from the above disadvantages and inadequacies and in consideration of the prior art outlined above, the object of the present invention is to further develop a circuit arrangement of the type mentioned at the outset and a method of the type mentioned at the outset in such a way that the power efficiency is significantly increased in comparison to prior art.

This object is achieved by a circuit arrangement according to the invention with the herein described features and by a method according to the invention with the herein described features. Advantageous embodiments and expedient developments of the present invention are described above and below.

This object is achieved by a circuit arrangement, in particular a driver circuit, for controlling at least one light emitting component, to which a threshold current is applied, in particular for controlling at least one electro-optical transducer, for example at least one laser, such as at least one semiconductor laser, wherein the circuit arrangement comprises:

at least one supply element, in particular at least one voltage source, for supplying the circuit arrangement with voltage, at least one current limiting element being arranged between the supply element and the light emitting component, and at least one switching element for controlling the light emitting component by means of at least one switching controller, with the switching element being arranged between the current limiting element and the light emitting component, wherein a maximum value of the current is providable by means of the current limiting element, and wherein the logical "1" of data to be transmitted by means of the light emitting component is given as periodic switching between the zero value of the current and the maximum value of the current supplied to the light emitting component.

This object is further achieved by an embodiment of the circuit arrangement according to the invention, wherein the average current flowing through the light emitting component is given by the maximum value of the current and by the ratio of the length of time of the maximum value of the current to the length of time of the zero value of the current.

This object is further achieved by an embodiment of the circuit arrangement according to the invention, wherein the current limiting element is supported for example by means of at least one decoupling capacitor, in particular on the output side.

This object is further achieved by an embodiment of the circuit arrangement according to the invention, wherein, in case of capacitive decoupling of the current limiting element, the maximum value of the current is given essentially by the average current.

This object is further achieved by an embodiment of the circuit arrangement according to the invention, wherein the ratio of the length of time of the maximum value of the current to the length of time of the zero value of the current is less than about 1 to 3; i.e., a ratio of about one third, and in particular is about 1 to 9; i.e., a ratio of about one ninth.

This object is further achieved by an embodiment of the circuit arrangement according to the invention, wherein the current limiting element is embodied
- as at least one transistor connected as current source or
- as at least one resistor or
- with mixing functionality, in particular as at least one transistor with (constant) current source behaviour as well as with resistive or resistor behaviour.

This object is further achieved by an embodiment of the circuit arrangement according to the invention, wherein the switching controller comprises at least one gate circuit, wherein
- the data is supplyable to one input of the gate circuit,
- oscillator signals are supplyable to the other input of the gate circuit, with the oscillator signals being providable by at least one oscillator unit, in particular determining the ratio of the length of time of the maximum value of the current to the length of time of the zero value of the current, and
- the output signal of the gate circuit controls the switching element.

This object is further achieved by an embodiment of the circuit arrangement according to the invention, wherein the gate circuit is embodied as at least one logical AND circuit.

This object is further achieved by a method for controlling at least one light emitting component, to which a threshold current is applied, in particular for controlling at least one electro-optical transducer, for example at least one laser, such as at least one semiconductor laser,
- with the circuit arrangement being supplied with voltage by means of at least one supply element, in particular by means of at least one voltage source, and
- with the light emitting component being controlled by means of at least one switching element arranged between at least one current limiting element and the light emitting component using at least one switching controller,
- wherein a maximum value of the current is provided by means of the current limiting element, and
- wherein the logical "1" of the data to be transmitted by means of the light emitting component is represented by periodic switching between the zero value of the current and the maximum value of the current supplied to the light emitting component.

This object is further achieved by an embodiment of the method according to the invention, wherein the average current flowing through the light emitting component is given
- by the maximum value of the current and
- by the ratio of the length of time of the maximum value of the current to the length of time of the zero value of the current.

This object is further achieved by an embodiment of the method according to the invention, wherein, in case of capacitive support of the current limiting element, in particular in case of capacitive decoupling of the current limiting element on the output side, the maximum value of the current is given essentially by the average current.

This object is further achieved by an embodiment of the method according to the invention, wherein the ratio of the length of time of the maximum value of the current to the length of time of the zero value of the current is less than about 1 to 3, and in particular is about 1 to 9.

This object is further achieved by an embodiment of the method according to the invention,
- wherein one input of the switching controller is supplied with the data, the switching controller in particular being represented by at least one gate circuit, for example being represented by at least one logical AND circuit,
- wherein the other input of the switching controller is supplied with oscillator signals being provided by at least one oscillator unit, in particular determining the ratio of the length of time of the maximum value of the current to the length of time of the zero value of the current, and
- wherein the output signal of the switching controller controls the switching element.

This object is further achieved by a use of the circuit arrangement and/or of the method according to the invention for supplying at least one optical signal, in particular light, to at least one optical waveguide for the purpose of transmission of data
- in at least one, in particular mobile, telecommunication system, for example in at least one communication device, such as in at least one mobile telephone,
- in at least one, in particular mobile, data communication system or in at least one, in particular mobile, data processing device, for example in at least one handheld, in at least one notebook or in at least one P[ersonal]D[igital]A[ssistant],
- in at least one, in particular mobile, data recording device and/or data reproducing device, for example in at least one camcorder, in at least one digital camera or in at least one H[igh]D[efinition]T[ele]V[ision], or
- in at least one transportation means, for example in at least one driver assistance system or in at least one navigation system of an automobile.

Whereas, according to prior art, the light emitting component, to which threshold current is applied, must be constantly provided with current during the logical "1", according to the invention the logical "1" is represented as periodic switching between the zero value and a maximum current supplied to the light emitting component to which threshold current is applied.

In preferred manner, the average current through the light emitting component is now dependent
- on the chosen maximum value of the current and
- on the so-called duty cycle, i.e. on the time ratio of said maximum value of the current to the zero value of the current.

The present invention finally relates to the use of at least one circuit arrangement according to the above-mentioned type and/or of a method according to the above-mentioned type for supplying at least one optical signal, in particular light, to at least one optical waveguide for the purpose of transmission of data
- in at least one, in particular mobile, communication device, such as in at least one mobile telephone,
- in at least one, in particular mobile, data processing device, such as in at least one handheld, in at least one notebook or in at least one P[ersonal]D[igital]A[ssistant], in at least one, in particular mobile, data recording device and/or data reproducing device, such as in at least one camcorder, in at least one digital camera or in at least one H[igh] D[efinition]T[ele]V[ision], or in at least one transportation means, such as in at least one driver assistance system or in at least one navigation system of an automobile.

BRIEF EXPLANATION OF THE DRAWINGS

As already discussed above, there are various possibilities for embodying and further developing the teaching of the present invention in an advantageous manner. For this purpose, on the one hand reference is made to the above explanations and to the dependent claims, and on the other hand further embodiments, features and advantages of the present invention are explained in greater detail below, inter alia with reference to the two exemplary embodiments illustrated by FIG. 7 to FIG. 8B.

It is shown in.

Like or similar embodiments, elements or features are provided with identical reference numerals in FIG. 1 to FIG. 8B.

BEST WAY FOR EMBODYING THE PRESENT INVENTION

Figure 8A:
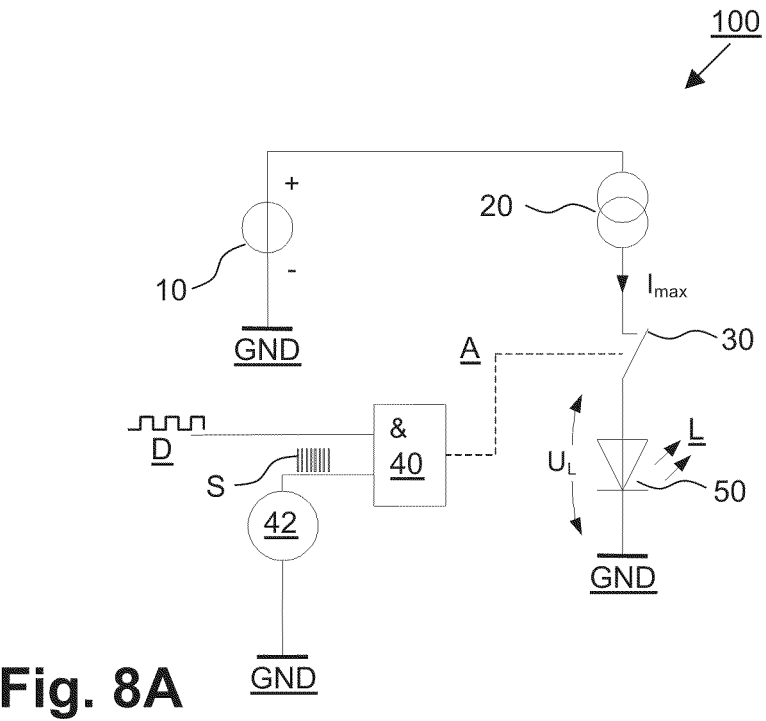
FIG. 8A in a schematic view a first embodiment of a circuit arrangement according to the present invention for supplying light to an optical waveguide (not shown for reasons of clarity), wherein said circuit arrangement is operated according to the method of the present invention.
Figure 8B:
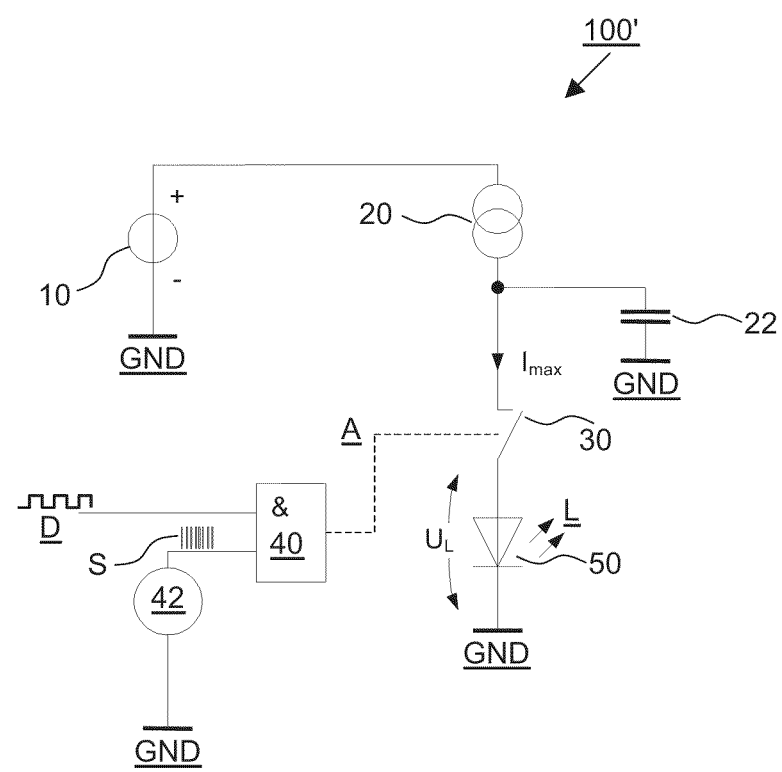
FIG. 8B in a schematic view a second embodiment of a circuit arrangement according to the present invention for supplying light to an optical waveguide (not shown for reasons of clarity), wherein said circuit arrangement is operated according to the method of the present invention.

In FIG. 8A and in FIG. 8B, a possible technical implementation of the present invention is shown, which is featured by a significantly higher power efficiency in comparison to prior art (cf. FIG. 2 and FIG. 6):

The circuit arrangement 100 (cf. FIG. 8A) or 100' (cf. FIG. 8B), being embodied as driver circuit, is provided for controlling a light emitting component 50, to which a threshold current $I_{th}$ is applied, in particular for controlling an electrooptical transducer, for example a laser, such as a semiconductor laser, and comprises a supply element 10 in form of a voltage source for supplying the circuit arrangement 100 (cf. FIG. 8A) or 100' (cf. FIG. 8B) with voltage.

Between the supply element 10 and the light emitting component 50, a current limiting element 20 is arranged by means of which a maximum value $I_{max}$ of the current is provided.

Said current limiting element 20 can be embodied for example in form of at least one transistor connected as current source or in form of at least one ohmic resistor.

Also an embodiment of the current limiting element 20 with mixing functionality is possible, such as in form of at least one transistor with (constant) current source behaviour as well as with resistive or resistor behaviour.

In case of assigning a capacitive support in form of a decoupling capacitor 22, for example on the output side, to the current limiting element 20, said maximum current $I_{max}$ corresponds at least approximately to the middle or average current $I_{av}$. In this connection, also embodiments or alternatives between $I_{max}$ and $I_{av}$ are possible.

Between the current limiting element 20 and the light emitting component 50, a switching element 30 is arranged for controlling the light emitting component 50 by means of a switching controller 40.

Said switching controller 40 is expediently embodied as gate circuit, for example as logical AND circuit 40, wherein one input of the logical AND circuit 40 is supplied with the data D to be transmitted by means of the light emitting component 50, the other input of the logical AND circuit 40 is supplied with oscillator signals S being provided by an oscillator 42, with said oscillator signals S defining the so-called duty cycle, i.e. the time relation between the maximum value $I_{max}$ of the current I and the zero value (I=0) of the current I, and the output signal A of the logical AND circuit 40 controls the switching element 30.

In order to obtain a degree of signal integrity as high as possible in the data sink, the logical "1" of the data signal D can be synchronized with the spike pulse defined by the oscillator signal S.

Figure 7:
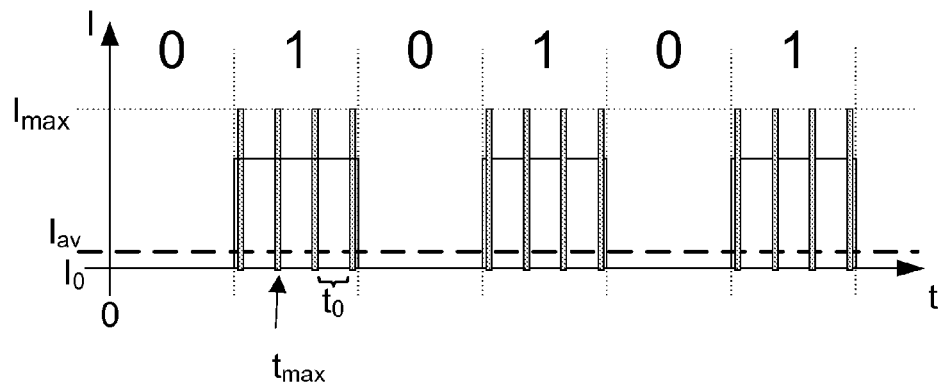
FIG. 7 in a schematic view a periodic switching-on, being effected according to the method of present invention, between the zero value of the current and the maximum value of the current during the logical "1"

As is also apparent from the illustration according to FIG. 7, the logical "1" is represented as periodic switching between the zero value of the current I and the maximum current $I_{max}$ of the current I supplied to the light emitting component 50 to which threshold current is applied.

The average current $I_{av}$ through the light emitting component 50 is thus dependent on the maximum value $I_{max}$ of the current and on the so-called duty cycle, i.e. on the ratio of the length of time $t_{max}$ (cf. FIG. 7) of the maximum value $I_{max}$ of the current I to the length of time $t_0$ (cf. FIG. 7) of the zero value (I=0) of the current I.

Said time ratio for example can be less than about 1 to 3, in particular can be about 1 to 9, which means that the time interval of the zero value (I=0) of the current I for example can be more than about three times longer than the time interval of the maximum value $I_{max}$ of the current I; in particular, the time interval of the zero value (I=0) of the current I for example can be about nine times longer than the time interval of the maximum value $I_{max}$ of the current I.

Figure 1:
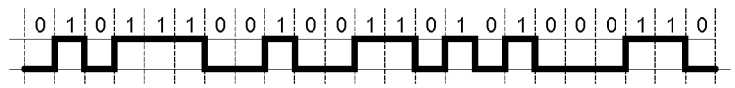
FIG. 1 in a schematic view a Non Return to Zero code (NRZ code) as typical PRIOR ART conventional modulation method in optical communication engineering.
Figure 2:
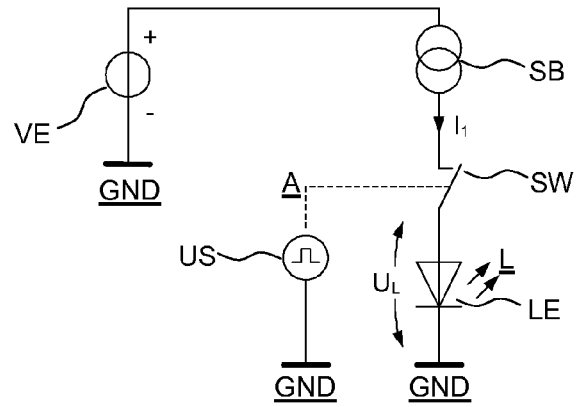
FIG. 2 in a schematic view a first embodiment of a PRIOR ART circuit arrangement for supplying light to an optical waveguide, wherein said circuit arrangement is operated according to the conventional principle of the NRZ modulation of a light emitting component.
Figure 3:
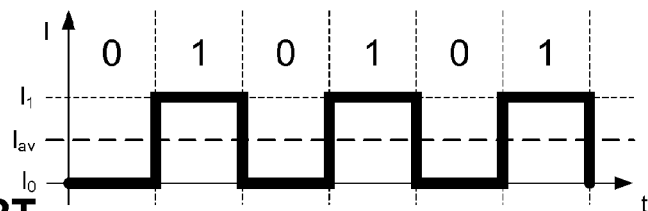
FIG. 3 in a schematic view the average current through a PRIOR ART NRZ modulated light emitting component with the same number of logical "0" and logical "1"
Figure 4:
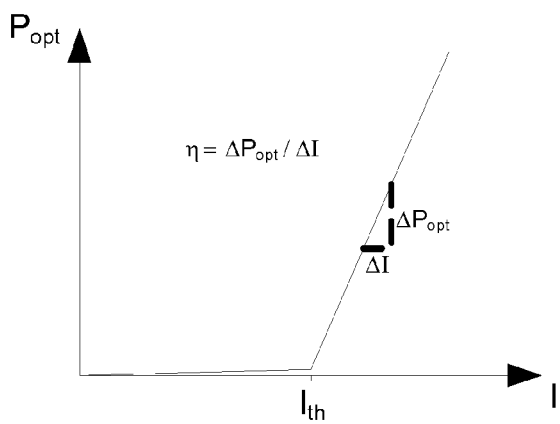
FIG. 4 in a schematic view the correlation between the supplied current and the optical output power for a PRIOR ART light emitting component to which threshold current is applied.
Figure 5:
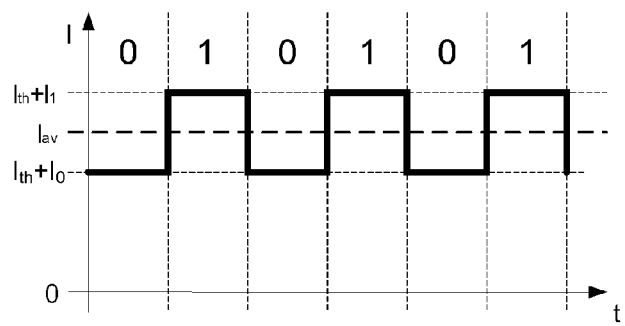
FIG. 5 in a schematic view the average current through a PRIOR ART NRZ modulated light emitting component, to which threshold current is applied, with the same number of logical "0" and logical "1"
Figure 6:
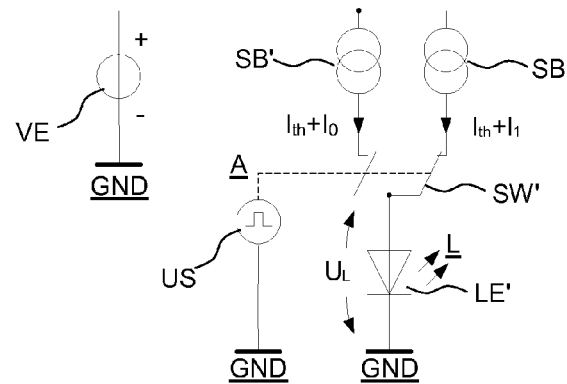
FIG. 6 in a schematic view a second embodiment of a PRIOR ART circuit arrangement for supplying light to an optical waveguide, wherein said circuit arrangement is operated according to the conventional principle of the NRZ modulation of a light emitting component to which threshold current is applied.

LIST OF REFERENCE NUMERALS 100 circuit arrangement, in particular driver circuit (=first embodiment; cf. FIG. 8A)
100' circuit arrangement, in particular driver circuit (=second embodiment; cf. FIG. 8B)
10 supply element, in particular voltage source
20 current limiting element
22 capacitive support of the current limiting element 20, in particular capacitive decoupling of the current limiting element 20 on the output side, for example capacitor assigned to the current limiting element 20 (=second embodiment; cf. FIG. 8B)
30 switching element, in particular switch
40 switching controller, in particular gate circuit, for example logical AND circuit
42 oscillator or oscillator unit
50 light emitting component to which threshold current $I_{th}$ is applied, in particular electro-optical transducer, for example laser, such as semiconductor laser
A output signal of the switching controller 40 or of the switching controller US (=prior art; cf. FIG. 2 and FIG. 6)
D data (signals) to be transmitted by means of the light emitting component 50
GND reference potential, in particular earth potential or ground potential or zero potential
I current supplied to the light emitting component 50 or to the light emitting component LE or LE' (=prior art; cf. FIG. 2 or FIG. 6)
$I_{av}$ middle current or average current
$I_{max}$ maximum value of the current I
$I_{th}$ threshold current of the light emitting component 50 or of the light emitting component LE' (=prior art; cf. FIG. 6)
$I_0$ current I corresponding to the logical "0"
$I_1$ current I corresponding to the logical "1"
LE light emitting component (=prior art; cf. FIG. 2)
LE' light emitting component, to which threshold current $I_{th}$ applied, in particular electro-optical transducer, for example laser, such as semiconductor laser (=prior art; cf. FIG. 6)
$P_{opt}$ optical output power of the light emitting component 50 or of the light emitting component LE (=prior art; cf. FIG. 2)
$P_{opt\_av}$ average optical output power of the light emitting component 50 or of the light emitting component LE (=prior art; cf. FIG. 2)
S signal of the oscillator or of the oscillator unit 42
SB current limiting element, in particular first current limiting element (=prior art; cf. FIG. 2 and FIG. 6)
SB' separate or second current limiting element for providing the threshold current $I_{th}$ (=prior art; cf. FIG. 6)
SW switching element, in particular switch (=prior art; cf. FIG. 2)
SW' switching element, in particular switch (=prior art; cf. FIG. 6)
t time
$t_{max}$ length of time of the maximum value $I_{max}$ of the current I
$t_0$ length of time of the zero value I=0 of the current I
$U_L$ flux voltage across the light emitting component 50 or across the light emitting component LE or LE' (=prior art; cf. FIG. 2 or FIG. 6)
US switching controller (=prior art; cf. FIG. 2 and FIG. 6)
VE supply element, in particular voltage source (=prior art; cf. FIG. 2 and FIG. 6)
η conversion efficiency factor, in particular nominal conversion efficiency factor, of the light emitting component 50 or of the light emitting component LE or LE' (=prior art; cf. FIG. 2 or FIG. 6)

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention.

The invention claimed is:

1. A circuit arrangement for controlling at least one light emitting component, to which a threshold current is applied, wherein the circuit arrangement comprises:
   at least one supply element for supplying the circuit arrangement with voltage,
   at least one current limiting element being arranged between the supply element and the light emitting component, and
   at least one switching element for controlling the light emitting component by means of at least one switching controller, with the switching element being arranged between the current limiting element and the light emitting component,
   wherein a maximum value of the current is providable by means of the current limiting element, and
   wherein a logical "1" of data to be transmitted by means of the light emitting component is given as periodic switching between a zero value of the current and the maximum value of the current supplied to the light emitting component, and
   wherein the current limiting element is capacitively supported, and
   wherein in case of capacitive decoupling of the current limiting element, the maximum value of the current is given essentially by the average current.

2. The circuit arrangement according to claim 1, wherein an average current flowing through the light emitting component is given
   by the maximum value of the current and
   by a ratio of the length of time of the maximum value of the current to the length of time of the zero value of the current.

3. The circuit arrangement according to claim 2, wherein the ratio of the length of time of the maximum value of the current to the length of time of the zero value of the current is less than about one third.

4. A circuit arrangement for controlling at least one light emitting component, to which a threshold current is applied, wherein the circuit arrangement comprises:
   at least one supply element for supplying the circuit arrangement with voltage,
   at least one current limiting element being arranged between the supply element and the light emitting component, and
   at least one switching element for controlling the light emitting component by means of at least one switching controller, with the switching element being arranged between the current limiting element and the light emitting component,
   wherein a maximum value of the current is providable by means of the current limiting element, and wherein a logical "1" of data to be transmitted by means of the light emitting component is given as periodic switching between a zero value of the current and the maximum value of the current supplied to the light emitting component, the switching controller including at least one gate circuit, wherein the data is suppliable to one input of the gate circuit, oscillator signals are suppliable to another input of the gate circuit, with the oscillator signals being providable by at least one oscillator unit, and an output signal of the gate circuit controls the switching element.

5. The circuit arrangement according to claim 4, wherein the current limiting element is capacitively supported.

6. The circuit arrangement according to claim 4, wherein, in case of capacitive decoupling of the current limiting element, the maximum value of the current is given essentially by the average current.

7. The circuit arrangement according to claim 4, wherein the current limiting element is embodied
as at least one transistor connected as current source or
as at least one resistor or
with mixing functionality as at least one transistor with constant current source behaviour as well as with resistive or resistor behaviour.

8. The circuit arrangement according to claim 4, wherein the gate circuit is embodied as at least one logical AND circuit.

9. The circuit arrangement according to claim 4, wherein the circuit arrangement is further configured for supplying at least one optical signal to at least one optical waveguide for the purpose of transmission of data
in at least one telecommunication system,
in at least one data communication system or in at least one data processing device,
in at least one data recording device and/or data reproducing device, or
in at least one transportation means.

10. A method for controlling at least one light emitting component, to which a threshold current is applied,
with the circuit arrangement being supplied with voltage by means of at least one supply element, and
with the light emitting component being controlled by means of at least one switching element arranged between at least one current limiting element and the light emitting component using at least one switching controller,
wherein a maximum value of the current is provided by means of the current limiting element, and
wherein the logical "1" of the data to be transmitted by means of the light emitting component is represented by periodic switching between the zero value of the current and the maximum value of the current supplied to the light emitting component,
wherein the average current flowing through the light emitting component is given
by the maximum value of the current and
by the ratio of the length of time of the maximum value of the current to the length of time of the zero value of the current, and
wherein in case of capacitive support of the current limiting element, the maximum value of the current is given essentially by the average current.

11. The method according to claim 10, wherein the ratio of the length of time of the maximum value of the current to the length of time of the zero value of the current is less than about one third.

12. The method according to claim 10,
wherein one input of the switching controller is supplied with the data,
wherein the other input of the switching controller is supplied with oscillator signals being provided by at least one oscillator unit, and
wherein the output signal of the switching controller controls the switching element.

13. A method for controlling at least one light emitting component, to which a threshold current is applied,
with the circuit arrangement being supplied with voltage by means of at least one supply element, and
with the light emitting component being controlled by means of at least one switching element arranged between at least one current limiting element and the light emitting component using at least one switching controller,
wherein a maximum value of the current is provided by means of the current limiting element, and
wherein the logical "1" of the data to be transmitted by means of the light emitting component is represented by periodic switching between the zero value of the current and the maximum value of the current supplied to the light emitting component,
wherein one input of the switching controller is supplied with the data,
wherein the other input of the switching controller is supplied with oscillator signals being provided by at least one oscillator unit, and
wherein the output signal of the switching controller controls the switching element.

14. The method according to claim 13, wherein the average current flowing through the light emitting component is given
by the maximum value of the current and
by the ratio of the length of time of the maximum value of the current to the length of time of the zero value of the current.

15. The method according to claim 13, wherein, in case of capacitive support of the current limiting element, the maximum value of the current is given essentially by the average current.

* * * * *